(12) United States Patent
Marzari et al.

(10) Patent No.: US 6,451,394 B1
(45) Date of Patent: *Sep. 17, 2002

(54) ASPHALT BLOCK RESISTANT TO COLD FLOW

(75) Inventors: Jorge A. Marzari, Bolingbrook; David C. Trumbore, LaGrange, both of IL (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/169,964

(22) Filed: Oct. 13, 1998

Related U.S. Application Data

(63) Continuation-in-part of application No. 09/940,463, filed on Sep. 30, 1997, now Pat. No. 5,989,662, which is a division of application No. 08/657,831, filed on May 31, 1996, now Pat. No. 5,933,616, and a continuation-in-part of application No. 08/606,320, filed on Feb. 23, 1996, now abandoned, and a continuation-in-part of application No. 08/606,321, filed on Feb. 23, 1996, now abandoned, which is a continuation-in-part of application No. 08/484,758, filed on Jun. 7, 1995, now abandoned.

(51) Int. Cl.⁷ .............................................. B65D 57/00
(52) U.S. Cl. ................... 428/35.2; 428/35.7; 428/36.8; 428/489; 206/447; 206/524.7; 264/212; 264/216
(58) Field of Search .............................. 428/35.2, 35.7, 428/36.8, 489; 206/447, 524.7; 264/212, 239, 216

(56) References Cited

U.S. PATENT DOCUMENTS

| | | | |
|---|---|---|---|
| 2,287,849 A | 6/1942 | Wilson | |
| 2,572,959 A | 10/1951 | Sparks et al. | |
| 2,639,808 A | 5/1953 | Barry et al. | |
| 2,762,504 A | 9/1956 | Sparks et al. | |
| 3,216,566 A | 11/1965 | Rosenthal | |
| 3,366,233 A | 1/1968 | Roediger | |
| 3,564,808 A | 2/1971 | Kent | |
| 3,832,825 A | 9/1974 | Dunbar | |
| 3,837,778 A | 9/1974 | Parker | |
| 3,851,438 A | 12/1974 | Brisman | |
| 3,987,602 A | 10/1976 | Stahl | |
| 4,073,760 A | * 2/1978 | Harris et al. | 524/68 |
| 4,137,692 A | 2/1979 | Levy | |
| 4,450,962 A | 5/1984 | Matthew et al. | |
| 5,109,892 A | 5/1992 | Somers | |
| 5,452,800 A | 9/1995 | Muir | |
| 5,470,455 A | 11/1995 | Santos | |
| 5,733,616 A | 3/1998 | Janicki | 428/35.7 |
| 5,765,686 A | * 6/1998 | Wright et al. | 206/447 |
| 5,989,662 A | * 11/1999 | Janicki et al. | 428/35.7 |
| 5,992,628 A | * 11/1999 | Vermillion et al. | 206/447 |

* cited by examiner

*Primary Examiner*—Rena L. Dye
(74) *Attorney, Agent, or Firm*—Inger H. Eckert; James J. Dottavio

(57) ABSTRACT

Asphalt is packaged in containers having breakage means, such as short notches, long channels, wedges or molded parts, to allow for easy breakage into smaller portions for ease of handling and feeding into kettles. Asphalt is also packaged so as to improve cold flow of the block while simultaneously reducing fumes at the kettle. The containers have various features to enhance processability and handleability, including a handhold portions and/or scooped portions.

33 Claims, 6 Drawing Sheets

FIG. 2B (ii)

FIG. 2C (iii)

ASPHALT BLOCK RESISTANT TO COLD FLOW

CROSS-REFERENCE TO RELATED APPLICATIONS

This is a continuation-in-part of U.S. patent application Ser. No. 09/940,463, filed Sep. 30, 1997, now U.S. Pat. No. 5,989,662, which is a divisional of U.S. patent application Ser. No. 08/657,831, filed May 31, 1996, now U.S. Pat. No. 5,933,616, which is a continuation-in-part of: Ser. No. 08/484,758, filed Jun. 7, 1995, now abandoned; Ser. No. 08/606,320, filed Feb. 23, 1996, now abandoned, which is a continuation-in-part of Ser. No. 08/484,758, now abandoned and Ser. No. 08/606,321, filed Feb. 23, 1996, now abandoned, which is also a continuation-in-part of Ser. No. 08/484,758, now abandoned.

TECHNICAL FIELD AND INDUSTRIAL APPLICABILITY OF INVENTION

The invention relates to improved asphalt blocks for use in applications such as roofing and paving. In particular, the invention further provides a reinforcement for asphalt blocks made in molds, and results in the asphalt block maintaining its shape even in hot weather. An additional feature of the invention provides reinforcing moldings located within the asphalt blocks to provide reinforcement and decrease deformation due to asphalt cold flow in warm weather. Another feature of the invention provides polymer moldings to reinforce handling features such as handles and wedges and to generate weaker spots that can contribute to splitting them in halves by knocking the blocks against a surface. A further feature of the invention provides a fume reduction ability when the asphalt block Is melted in the kettle due to the melting down of polypropylene and/or TruMelt formulation moldings inserted in the asphalt package.

BACKGROUND OF THE INVENTION

In the asphalt industry, one way of transporting asphalt to the users is in the form of individual packages or blocks, which are used often by building contractors as a source of asphalt for roofing and other construction applications. Individual packages of asphalt are often formed at conventional roofing asphalt-processing facilities by pouring molten asphalt into containers made of a metal bottom and paper cylindrical sidewalls. The asphalt is typically poured at temperatures of about 177° C. and the packages are allowed to cool for twenty-four hours prior to shipping to users, such as roofing contractors. After removing the paper and metal container, which become waste, the roofing worker places the solid asphalt in a gas-fired melting to melt down the asphalt.

Packages have been developed that eliminate the need to remove or dispose of the container. One type of such a package is disclosed in, e.g., U.S. Pat. Nos. 5,452,800 and 5,307,608, which relate to asphalt packages employing thin polypropylene based film as the sole containment means and methods of manufacture. The disclosure of these patents is herein incorporated by reference.

Another type of consumable asphalt package that has been developed is a moldable container described in U.S. Pat. Nos. 5,733,616 and 5,765,686, the disclosure of which is incorporated by reference herein. The consumable containers molded from compositions comprise asphalt and polymer material. The containers may be of cylindrical or rectangular designs, and may be tapered for stacking and include such features as handholds to facilitate handling and annular protrusions or circumferential ribs to enhance dimensional stability.

Although moldable consumable containers have been attained, which have an advantage of reducing fuming in an asphalt-melting kettle, improvements are especially needed in the lower end traditional asphalt block molding processes, so as to reduce cold flow and aid in handling of the molded asphalt blocks.

SUMMARY OF THE INVENTION

Accordingly, an object of the invention is to provide an asphalt block or package that is convenient to handle in manufacture and use. An additional object is to provide a package that is freestanding and strong to withstand deformation due to asphalt cold flow, especially in warm weather. A further object is to provide a container or asphalt block that reliably can be broken in smaller pieces at the job site when it is knocked against a hard surface reducing or eliminating clean-up of small pieces of asphalt. A further object of the invention is to provide a stronger asphalt block that has improved resistance to cold flow in warm weather while also reducing emissions at the kettle when melted for lower end asphalt blocks produced in traditional mold processes. These and other objects are achieved by the asphalt blocks according to the invention.

An aspect of the invention may be used In containers such as traditional asphalt molds, i.e. nonconsumable. These traditional molds are typically metal, plastic, cardboard or combinations of such materials and are used to produce asphalt blocks. The blocks produced have severe problems of cold flow. An embodiment of the invention which directly improves the cold flow deformation in asphalt blocks made in nonconsumable molds comprises a retaining means such as a liner or band of polymer film used inside the mold. The liner has a thickness of from about 2–5 mils and lines the mold In which the asphalt is poured. The liner may be used as a sheet or film lining only the side walls or edges of the mold or it may be used to line the entire inner surface of the mold. In another embodiment, the retaining means used to improve the cold flow comprises slabs, bars or beams of polymer. In these embodiments, the retainer comprises up to 100% total polymer(s). In a particularly preferred embodiment, the polymer is polypropylene, polyethylene, ethylene vinyl acetate, EMA, or a polymer in combination with asphalt such as Trumelt™ (see U.S. Pat. No. 5,733,616).

In one embodiment, an asphalt block or package of the invention comprises a breakage means which comprises wedges or molded parts that are added after the lining film at the bottom of the mold or container. The breakage means may also be used in a mold that does not contain a lining firm. The wedges or parts are added before or after the asphalt is poured into the mold and are oriented such that the sharp or more narrow edge aims toward the interior of the block. The wedges or molded parts are made of polymers such as polypropylene or any other polymer which does not significantly detract from the strength or performance of the asphalt. The breakage means of the invention allow for the production of larger asphalt blocks that may be broken at the site of use. In a preferred embodiment the wedges or molded parts also reduce gaseous emissions when the blocks are melted.

In another embodiment a polymer film retaining means is added inside the mold prior to addition of the asphalt. In a preferred embodiment a reinforcing polymer film band may be placed, glued, adhered or stamped in the inside or outside of the polymer film. Another embodiment uses the polymer film band without the use of the polymer film liner. The polymer film band may be used as a retainer in containers such as consumable containers and nonconsumable molds.

A further embodiment for reinforcing the block so as to reduce cold flow problems comprises the use of reinforcing moldings or beams. The moldings or beams are used along the sides of the mold and are placed inside the mold. The beams may be used in applications using the polymer film liner in consumable or nonconsumable molds.

An additional embodiment Involves the use of polymer moldings inserted or molded into the molds to shape handles in the resulting asphalt blocks.

Other features and advantages of the invention will become apparent from the detailed description in conjunction with the drawings.

DETAILED DESCRIPTION AND PREFERRED EMBODIMENTS OF THE INVENTION

Figure 1A:
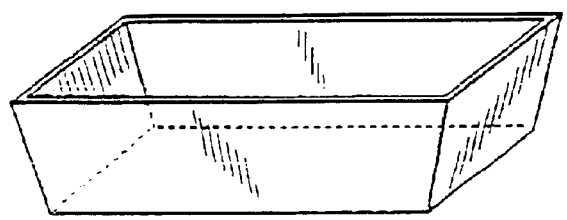
FIG. 1a is a representation of a regular polypropylene mold as described in U.S. Pat. No. 5,307,608.
Figure 1B:
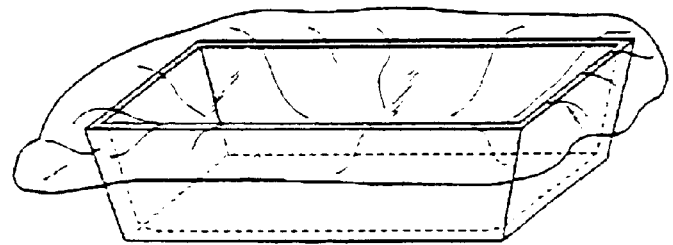
FIG. 1b demonstrates the technology wherein a polymer film such as PP or PE is used to line a mold prior to asphalt being poured in FIG. 1c.
Figure 1C:
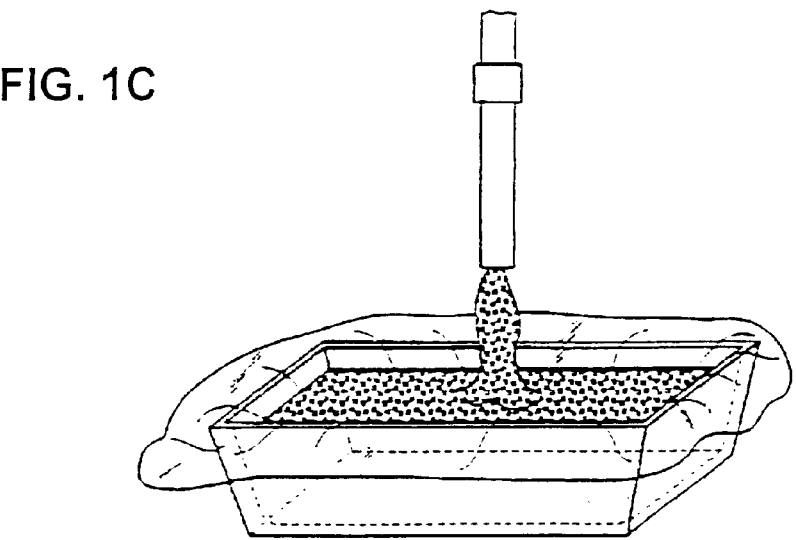
Figure 2A:
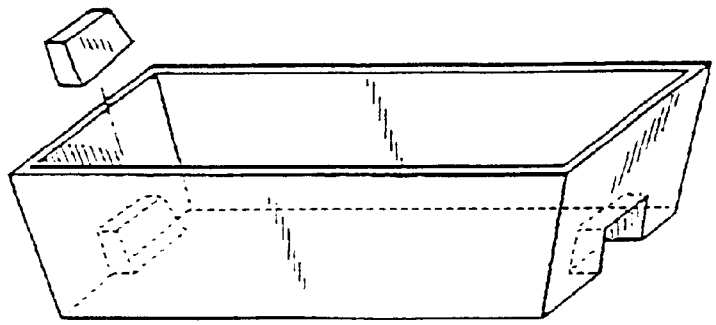
FIG. 2a demonstrates moldings that are inserted or molded into a mold so as to shape handles in asphalt blocks. The moldings may be located in each side or alternated. At least one is used in the mold. Any of the features shown in FIG. 2a (i–iii) may be used singly or altogether to mold the asphalt block. In addition, a polymer film liner is Inserted into the mold as in FIG. 1 prior to pouring of the molten asphalt.
Figure 2A:
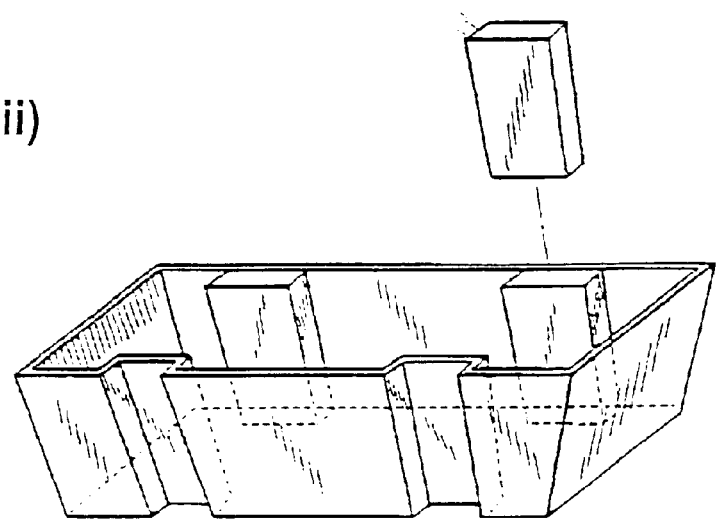
Figure 2A:
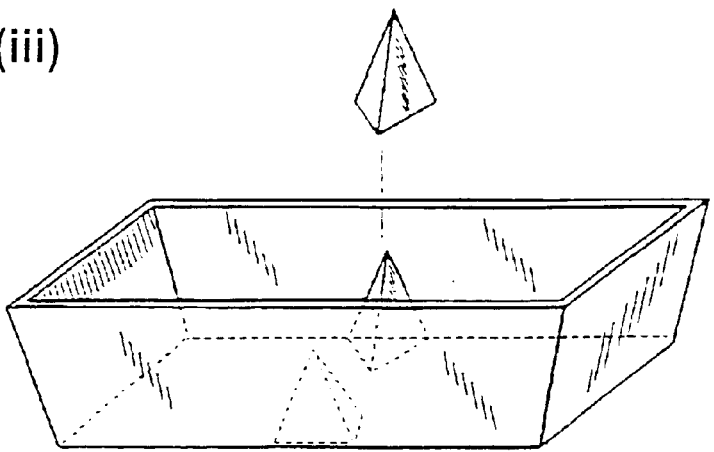

In an alternative preferred embodiment, a thin polymeric film that is dissolvable in the asphalt, preferably a polypropylene film having a thickness of from about 1 mil to 5 mils, is used as a cover means for one or more of the containers. In a preferred embodiment, a polypropylene film may be placed on top of each layer of containers (e.g., nine containers of asphalt per pallet layer). Another embodiment comprises the use of shrink wrap or stretch wrap as a cover means for the container.

Asphalt used in accordance with the invention comprises asphalt that is raw or processed asphalt, preferably in an amount of from about 30 to about 100 pounds, to be melted and used in an application such as roofing or paving. The terms "asphalt" and "raw or processed asphalt" are meant to include asphalt bottoms from petroleum refineries, as well as naturally occurring bituminous materials such as asphalts, gilsonite, tars, and pitches, or these same materials that have been air-blown or otherwise chemically processed or treated. For example, the asphalt can be air blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used. A preferred asphalt has a ring-and-ball softening point higher than about 90° C. This softening point is typically measured according to ASTM D36.

The containers or molds are preferably made from wood, metal, paper, cardboard or a combination. Examples may be found in U.S. Pat. Nos. 5,452,800, 5,307,608, and 3,387,778, incorporated herein by reference.

In a preferred embodiment, an asphalt block according to the invention can be used to package paving asphalt and to reduce fuming of this asphalt when melted. For instance, a block may contain air-blown paving-grade asphalt in the range of from AC-2 to AC-50, more preferably AC-10 or AC-20. For the polymer additives (pellets, retaining means and/or breakage means) for such an asphalt, the amount of polymer material used in the additives composition is preferably sufficient to provide a total of from about 0.25 to about 5% by weight based on the total weight of the block (additives plus the asphalt contained therein). A preferred block composition comprises, by weight, from about 95% to about 99.75% asphalt with about 97 to about 99.75 being most preferred, and from about 0.25% to about 5% polymer material. It should be noted that although most polymers are soluble in asphalt some are not soluble in the ASTM method used to determine solubility in asphalt. For example, polypropylene, although soluble in asphalt is not soluble in the trichloroethylene used in the ASTM method. Therefore of the 0.25% to about 5% polymer material, no more than about 1% of the polymer should be of the type that do not dissolve in trichloroethylene. Depending on the amount of the use of the polymer additives, the material when melted in a kettle or heating vessel may cause a significant visual reduction of fumes from the kettle compared to the asphalt alone (without any polymer) when melted in the kettle. The visual reduction of fumes may be measured as a reduction in opacity.

Preferably, the added polymer has a melt flow index from about 10 to about 95 grams/10 minutes, more preferably from about 25 to about 85 grams/10 minutes, and even more preferably from about 35 to about 75 grams/10 minutes. A lower melt flow index generally Indicates a more viscous polymer. If the melt flow index is too low, it is difficult to disperse the polymer in the asphalt without agitation. The melt flow index is measured at 190° C. under a 2.16 kg load according to ASTM D1238 Method B. Of course, this parameter, like the other parameters mentioned herein, may be measured by any other suitable test.

In preferred embodiments, the polymer of the added pellets (see related U.S. application Ser. No. 08/990,012), retainer means and/or breakage means has a relative density lower than that of the asphalt so that it rises to the upper surface of a kettle and forms a polymer skim or skin on top of the molten asphalt to reduce fuming. The polymer should be miscible and compatible with the asphalt, without significantly modifying the asphalt in the amount added. Preferably, the polymer material is selected from polypropylenes, ethylene-vinyl acetate copolymers, ethylene-methylacrylate copolymers (EMA), synthetic rubbers such as SBS, SBR, SEBS or EPDM, and mixtures thereof. The ethylene-vinyl acetate copolymer preferably has a vinyl acetate content from about 5% to about 40% by weight, preferably from about 9% to about 28% by weight, so that it is suitably soluble in the asphalt. Other appropriate polymers, and mixtures of such polymers, can also be used.

In another embodiment, the added pellets, retainer means and/or breakage means comprise an asphalt polymer blend such as Trumelt® that is described in U.S. Pat. No. 5,733,616.

Preferably, from about 0.25% to about 5% polymer is added by weight of the total asphalt and polymer. For a block for roofing asphalt, more preferably from about 0.5% to about 3%, and even more preferably from about 1% to about 2.5%, polymer is added based on the total weight of asphalt and polymer. For a block for paving-grade asphalt, more preferably from about 1 to about 5% polymer is added based on the total weight of asphalt and polymer.

One or more filler materials, such as crushed stone, glass fibers, talc, calcium carbonate, Permamob (obtained from Owens-Corning), EBS wax or silica, can be added to the asphalt. Such filler materials would be undesirable in some end uses of packaged asphalt. It is to be understood, however, that the filler materials are to be ignored when calculating the percentages of other specified materials in the asphalt; thus, the weight percentages of ingredients given herein are based on total weights of the materials or compositions exclusive of any filler or the like present in the material or composition.

Optionally, non-polymeric chemical modifiers, such as phosphoric acid, ferrichloride, EVA and EBS may be added to the block composition. This permits the use of one or a few standard asphalts to fill the containers, with the desired chemical additives for optimizing the asphalt for the intended application being added to the asphalt via the additives. Thus, asphalt blocks may be efficiently produced according to the specifications of each customer.

Molten asphalt may be used as paving asphalt, preferably one that is readily cold-flowable, In accordance with the invention. The polymer material and/or another ingredient may advantageously enhance the properties of the asphalt for paving purposes, such as high-temperature performance as measured by, e.g., the Federal Highway Association's pending Strategic Highway Research Program (SHRP) specification, when the package is melted. Exemplary polymers for improving asphalt paving properties are ethylene vinyl acetate (EVA), EMA, SBS, and polypropylene. The composition of the additives may optionally include one or more fillers, such as organic or inorganic fibers.

Alternatively, molten asphalt made in accordance with the invention may be used as a roofing asphalt. Preferably, the asphalt without (before addition of) the polymer meets the requirements for at least one type of roofing asphalt according to ASTM D312 (see Table 1), more particularly ASTM D312-89. Preferred examples include Type IIII (asphalts that are relatively nonsusceptible to flow at roof temperatures for use in the construction of built-up roof construction on inclines from approximately 8.3% (1 in/ft) slope to 25% (3 in/ft) slope) and IV (asphalts that are generally nonsusceptible to flow at roof temperatures for use In the construction of built-up roofing on inclines from approximately 16.7% (2 in/ft) slope to 50% (6 in/ft) slope) asphalt. It is preferred that the addition of the polymer to the asphalt reduces fuming but does not significantly change the properties of the asphalt. Consequently, the asphalt with the added polymer preferably also meets the requirements for at least one type of roofing asphalt according to ASTM D312. More preferably, the asphalt with the added polymer meets the following ASTM D312 specifications for a Type IIII roofing asphalt: softening point (by ASTM D36) of 85–96° C; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the polymer to the asphalt does not change the softening point of the asphalt by more than about 9° C., more preferably not more than about 3° C., and does not change the penetration of the asphalt by more than about 10 dmm at 25° C. A preferred roofing-asphalt package weighs about 40 to about 100 lbs. With 50 being preferred (32.6 kg) and includes a container of the invention holding Type IIII ASTM D312-89 asphalt.

TABLE 1

Physical Requirements of Asphalt In Roofing

| | Type I | | Type II | | Type III | | Type IV | |
|---|---|---|---|---|---|---|---|---|
| Property | Min | Max | Min | Max | Min | Max | Min | Max |
| Softening point ° F. (° C.) | 135 (57) | 151 (66q) | 158 (70) | 176 (80) | 185 (85) | 205 (96) | 210 (99) | 225 (107) |
| Flash point ° F. (° C.) | 475 (246) | | 475 (246) | | 475 (246) | | 475 (246) | |
| Penetration, units: | | | | | | | | |
| at 32° F. (0° C.) | 3 | | 6 | | 6 | | 6 | |
| at 77° F. (25° C.) | 18 | 60 | 18 | 40 | 15 | 35 | 12 | 25 |
| at 115° F. (46° C.) | 90 | 180 | | 100 | | 90 | | 75 |
| Ductility at 77° F. (25° C.) cm | 10.0 | | 3.0 | | 2.5 | | 1.5 | |
| Solubility in trichloroethylene, % | 99 | | 99 | | 99 | | 99 | |

The consumable polymer compositions are preferably molded to form the retainer and/or breakage means of the invention. The molded retainers and breakage means are inserted into the mold prior to the addition of molten asphalt or afterwards, the asphalt is then allowed to solidify by cooling, preferably using cooled or ambient air.

Figure 3:
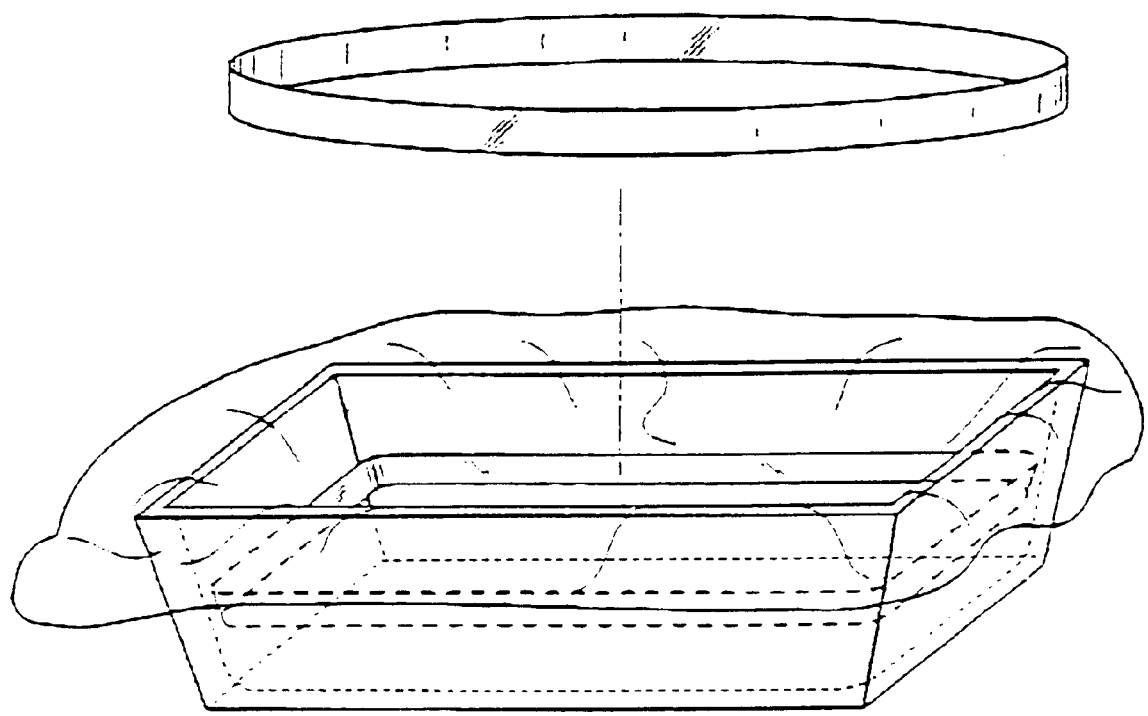
FIG. 3 demonstrates the use of a polymer band to reinforce the sides of a mold. The band may be used in conjunction with a polymer liner as shown in the Figure.

FIG. 3 demonstrates the use of the liner or band of polymer film used as a retainer in the making of an asphalt block. The retainer comprises up to 100% total polymer(s) and has a thickness of from about 1.3 mils to about 6 mils with about 2 to about 5 mils being preferred. Suitable retainers comprise polymers such as polypropylene, polyethylene, and ethylene vinyl acetate.

Figure 4A:
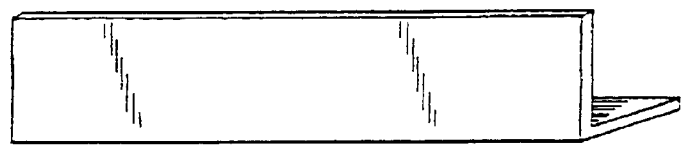
FIG. 4a demonstrates the use of reinforcing moldings located at the side, 4b, of the molds. The Figure demonstrates that the molding can be used with or without a polymer film and that when used with the film it can be used inside or outside of the film.
Figure 4B:
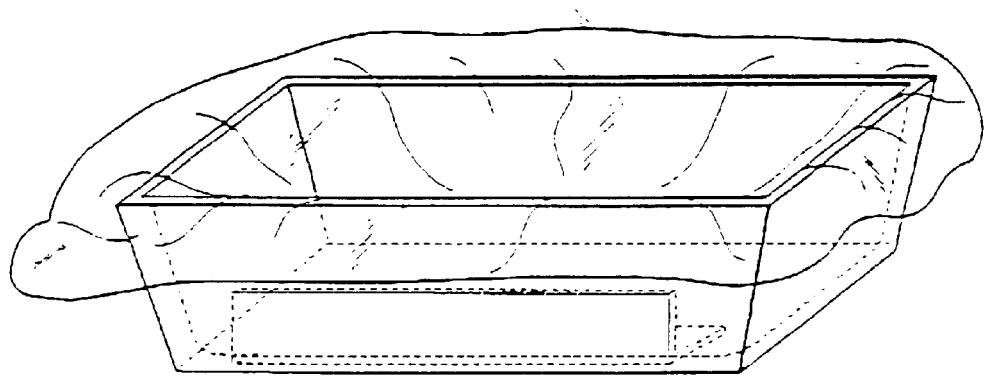
FIGS. 4b and c show the use of moldings for side reinforcement that also serve to function as handles or wedges.
Figure 4C:
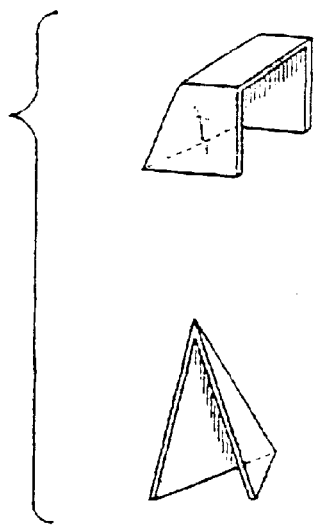
Figure 5A:
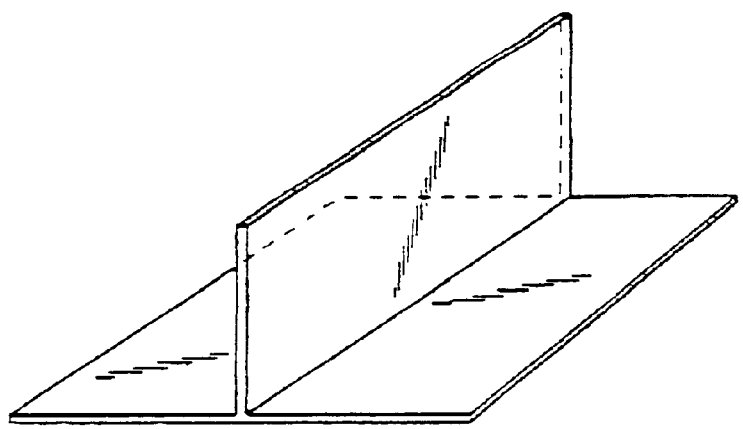
FIG. 5 shows the use of moldings shaped so as to facilitate block breakage.
Figure 5B:
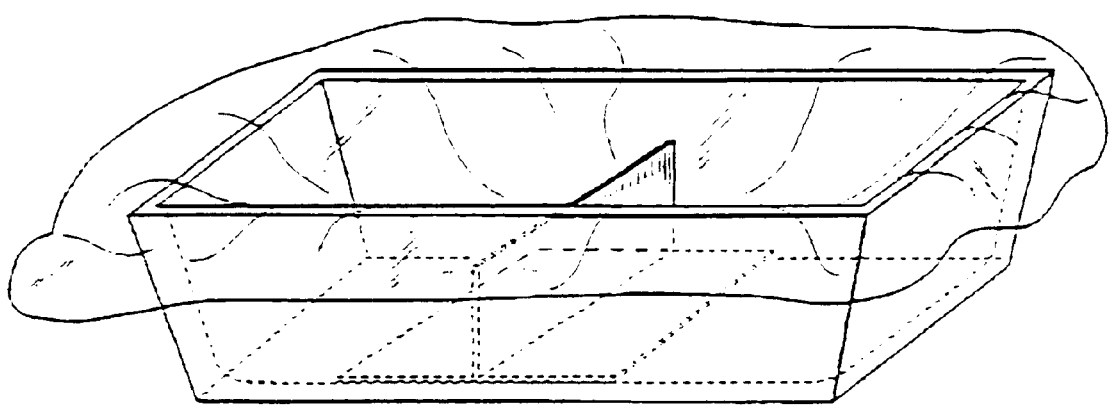

In another embodiment, the retaining means is a slab, band, bar or reinforcing of polymer placed inside of a mold. The retaining means may be oriented as shown in FIG. 4b so as to provide improvement in the cold flow of the asphalt block. Depending on the polymer used and the amount in the retaining means relative to the asphalt, the retaining means may also improve performance and strength characteristics of the asphalt when used. When used with a liner, the retaining means may be placed inside the mold before or after the liner is placed in the mold. In a preferred embodiment, it is placed in the mold after the liner.

Figure 6A:
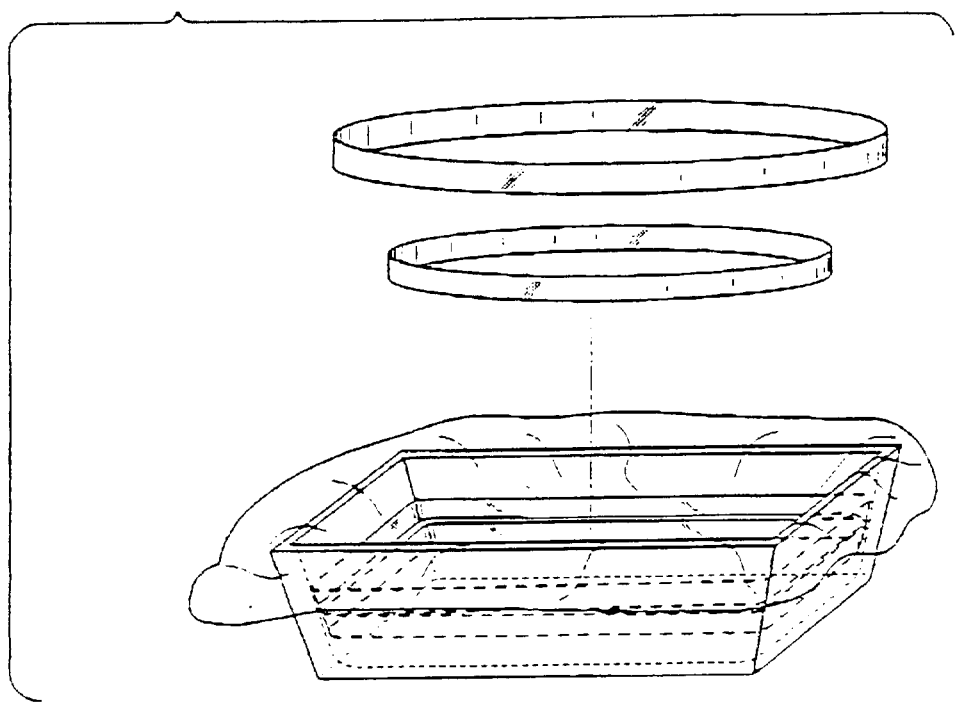
FIG. 6a shows the use of multiple polymer bands nested within a mold.
Figure 6B:
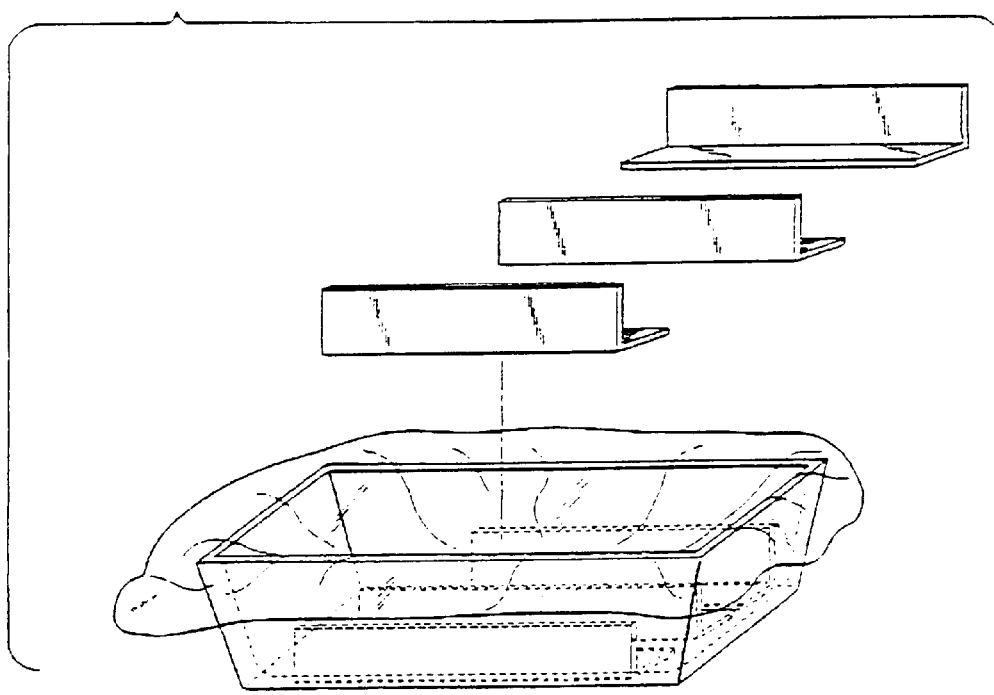
FIG. 6b demonstrates the use of multiple beams placed within a mold so as to decrease cold flow.

The retaining means may be positioned as shown in FIG. 4b to be parallel to the side of the mold. The retaining means may be placed flush along the side of the mold or it may be placed some distance away. In one embodiment, at least two retaining means are used as is shown in FIG. 6, however multiple retaining means may be spaced within the mold as shown in FIG. 6a. Combinations of retaining means and breakage means may also be used.

Although the invention has been described in detail in reference to preferred features and embodiments, appropriate modifications will become apparent to the artisan. For instance, the container dimensions and configurations of various features may be suitably varied. Side or end recesses, which may be single- or multi-faceted with planar or curved surfaces, may extend all the way up to the top perimeter of the container to help further reduce deformation upon filling. Thus, the invention is intended not to be limited by the foregoing description, but to be defined by the appended claims and their equivalents.

What is claimed is:

1. An asphalt block product comprising:
    (a) an exterior liner comprising a polymer film, the liner having a projection or indentation; and
    (b) asphalt in the shape of a block within the liner;
    the projection or indentation of the liner forming an indentation in or projection from the asphalt block, the indentation or projection of the asphalt block functioning as at least one of a retaining means to increase resistance of the asphalt block to cold flow, a breakage means to facilitate breakage of the as block product into smaller portions, and a handling means to facilitate handling of the asphalt block product.

2. The asphalt block product of claim 1, wherein said exterior liner is a polymer material selected from the group consisting of: polypropylene, polyethylene and ethylene vinyl acetate.

3. A method of improving the resistance to cold flow of an asphalt block comprising:
    (a) inserting a retaining means into a mold prior to pouring asphalt into the mold, the mold or retaining means having a projection or indentation, the retaining means being separate from the mold;
    (b) pouring the asphalt into the mold to form an asphalt block product comprising an asphalt block and the retaining means; and
    (c) removing the asphalt block product from the mold;
    the projection or indentation of the mold or retaining means forming an indentation in or projection from the asphalt block, the retaining means reinforcing the asphalt to increase resistance of the asphalt block to cold flow.

4. The method of claim 3, wherein said retaining means is selected from the group consisting of a liner, a band, a bar, a slab, a beam and a molding.

5. The method of claim 4, wherein said retaining means is a polymer material selected from the group consisting of: polypropylene, polyethylene, ethylene vinyl acetate, ethylene-methylacrylate copolymers, and blends thereof, or a blend of polymer and asphalt.

6. A method of improving the resistance to cold flow of an asphalt block comprising:
    (a) inserting a liner into a mold, the liner being separate from the mold;
    (b) inserting into the mold a retaining means selected from the group consisting of a band, a bar, a slab, a beam, and a molding, the retaining means being separate from the mold and the liner;
    (c) pouring asphalt into the mold to form an asphalt block product comprising an asphalt block, the liner and the retaining means, the asphalt block being within the liner; and
    (d) removing the asphalt block product from the mold;
    the retaining means reinforcing the asphalt to increase resistance of the asphalt block to cold flow.

7. The method of claim 6, wherein said retaining means is inserted prior to pouring the asphalt into the mold.

8. The method of claim 6, wherein said retaining means is inserted after the asphalt is poured into the mold.

9. The method of claim 6, wherein said retaining means comprises a polymer material selected from the group consisting of polypropylene, polyethylene, ethylene vinyl acetate, ethylene-methylacrylate copolymers, and blends thereof.

10. The method of claim 6, wherein said retaining means has a cross-sectional shape selected from the group consisting of L, X, C, T, V, Y, Z, A, ⊓, ⊓,□, O, E, F, H, I, K, M, S.

11. An asphalt block product having resistance to cold flow comprising:
    (a) asphalt in the shape of a block; and
    (b) a discrete retaining means within the asphalt block, the retaining means being selected from the group consisting of a bar, a beam, a slab, a band, and a molding, the retaining means reinforcing the asphalt to increase resistance of the asphalt block to cold flow.

12. The asphalt block product of claim 11, wherein said retaining means is a band.

13. The asphalt block product of claim 11, wherein said retaining means is a molding or beam.

14. The asphalt block product of claim 11, wherein said retaining means has a cross-sectional shape selected from the group consisting of L, X, C, T, V, Y, Z, A, ⊓, ⊓, □, O, E, F, H, I, K, M, S.

15. A method of improving the resistance to cold flow of an asphalt block comprising:
    (a) inserting a polymer liner into a mold prior to pouring asphalt into the mold, the liner being separate from the mold;
    (b) inserting a retaining means along an inner side of the mold, the retaining means being selected from the group consisting of a slab, a band, a bar, a molding, and a beam, the retaining means being separate from the mold and the liner;
    (c) pouring asphalt into the lined mold to form an asphalt block product comprising the liner, an asphalt block within the liner, and the retaining means; and (d) removing the asphalt block product from the mold;

the retaining means reinforcing the asphalt to increase resistance of the asphalt block to cold flow.

16. The method of claim 15, wherein said retaining means is comprised of a polymer material selected from the group consisting of polypropylene, polyethylene, ethylene vinyl acetate, ethylene-methylacrylate copolymers, and blends thereof, or a blend of a polymer material and asphalt.

17. The method of claim 15, wherein the retaining means is a first retaining means, and the method further comprises inserting a second retaining means along an inner side of the mold.

18. An asphalt block product having resistance to cold flow comprising:

(a) an exterior liner comprising a polymer film, the liner having a side;

(b) a discrete retaining means extending along the side of the liner, the retaining means being selected from the group consisting of a bar, a beam, a slab, a band, and a molding, the retaining means being separate from the liner; and (c) asphalt in the shape of a block within the liner;

at least one of the retaining means and the liner forming an indentation in the asphalt block, the retaining means reinforcing the asphalt to increase resistance of the asphalt block to cold flow.

19. A method of improving an asphalt block comprising the steps of:

(a) inserting a feature into a mold prior to pouring asphalt into the mold to form an asphalt block, the feature being selected from the group consisting of a retaining means to increase resistance of the asphalt block to cold flow, a breakage means to facilitate breakage of the asphalt block into smaller portions, and a handling means to facilitate handling of the asphalt block, the feature having a projection or indentation to form an indentation in or projection from the asphalt block, the feature being separate from the mold;

(b) pouring the asphalt into the mold to form the asphalt block having an external surface, the external surface including the feature; and (c) providing a covering for the external surface of the asphalt block to form an asphalt block product comprising the covering, the asphalt block within the covering, and the feature, the covering being separate from the feature and the mold.

20. A method according to claim 19, wherein the feature comprises a polymer material and the feature is consumable when the asphalt block is melted.

21. A method according to claim 19, wherein the covering comprises a polymer film material.

22. A method according to claim 21, wherein the covering is consumable when the asphalt block is melted.

23. A method according to claim 22, wherein the asphalt block product comprises a low fuming asphalt having a polymer content of 0.25% to about 5% by weight of the asphalt, said polymer effective to reduce the visual opacity of fumes emitted when melting said asphalt and polymer by at least about 25% with respect to the same asphalt without the polymer.

24. A method according to claim 22, wherein the step of providing the covering comprises placing a liner in the mold prior to pouring the asphalt into the mold.

25. A method according to claim 24 wherein the liner is placed in the mold prior to the package feature means.

26. A method according to claim 24 wherein the package feature means is placed in the mold prior to the liner.

27. A method according to claim 19, wherein the breakage means comprises short notches, long channels, wedges or molded parts, to allow for easy breakage of the block into smaller portions for ease of handling and feeding into kettles.

28. A method according to claim 19, wherein the retaining means is selected from the group consisting of a band, a slab, a bar, a beam and a molding.

29. A method according to claim 19 wherein the covering is removed from the asphalt block product prior to melting the asphalt.

30. A method according to claim 24 wherein the package feature is placed, glued, adhered or stamped in the inside or outside of the liner prior to pouring the asphalt.

31. An asphalt block product having resistance to cold flow comprising:

(a) asphalt in the shape of a block, the asphalt block having a surface; and (b) a discrete retaining means positioned within the asphalt block and extending along the surface of the asphalt block, the retaining means being selected from the group consisting of a slab, a band, a bar, a molding and a beam, the retaining means being made from a polymer or a blend of asphalt and polymer, the retaining means reinforcing the asphalt to increase resistance of the asphalt block to cold flow.

32. The asphalt block of claim 31, wherein the retaining means is a first retaining means, and additionally comprising a second retaining means.

33. A method of improving the resistance to cold flow of an asphalt block comprising:

(a) inserting a discrete retaining means along an inner side of a mold, the retaining means being selected from the group consisting of a slab, a band, a bar, a molding and a beam, the retaining means being made from a polymer or a blend of asphalt and polymer, the retaining means being separate from the mold;

(b) pouring asphalt into the mold to form an asphalt block product comprising an asphalt block and the retaining means, the asphalt block having a surface; and (c) removing the asphalt block product from the mold;

the retaining means being positioned within the asphalt block and along the surface of the asphalt block, the retaining means reinforcing the asphalt to increase resistance of the asphalt block to cold flow.

* * * * *